V. H. FELT.
Harvester Rake.
No. 102,525.   Patented May 3, 1870.
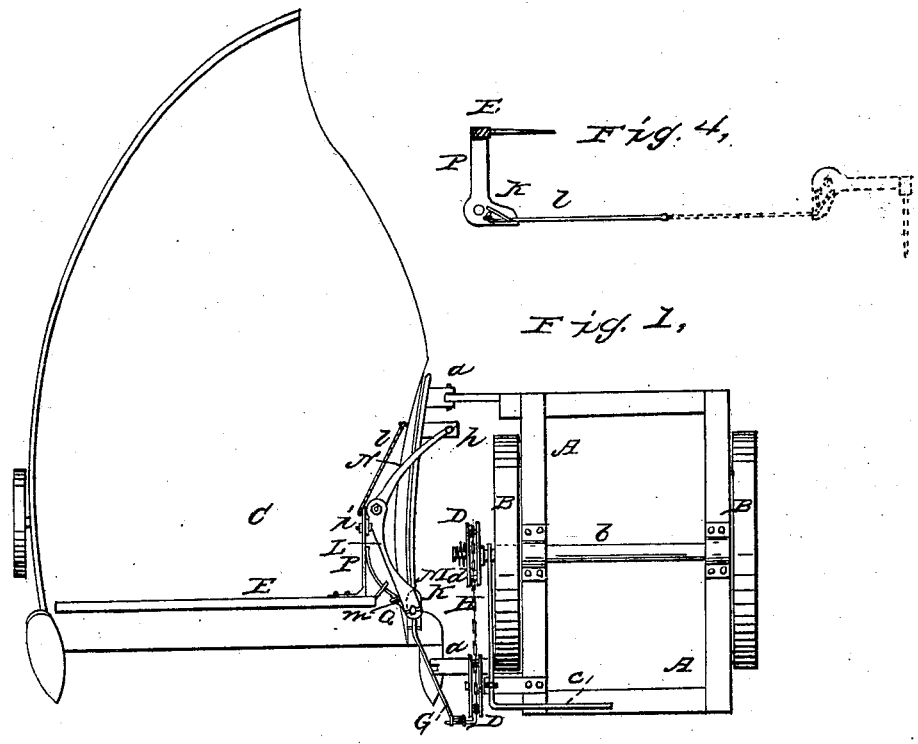
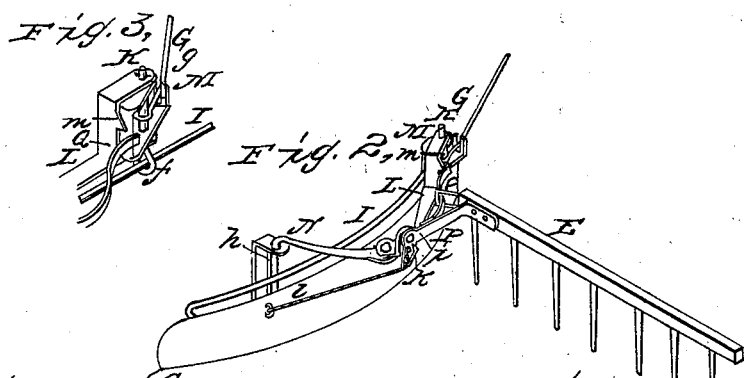

United States Patent Office.

VANDERLYN HOWARD FELT, OF KENDALL, NEW YORK.

Letters Patent No. 102,525, dated May 3, 1870.

IMPROVEMENT IN HARVESTER-RAKES.

The Schedule referred to in these Letters Patent and making part of the same.

*To all whom it may concern:*

Be it known that I, VANDERLYN HOWARD FELT, of Kendall, in the county of Orleans and State of New York, have invented a certain new and useful Improvement in Operating the Rakes of Harvesters, of which the following is a specification, referring to the accompanying drawings.

Nature of Invention.

This invention is an improvement upon that patented January 7, 1868, and consists in a simpler and more effective mechanism for operating the rake, as hereinafter described.

General Description.

In the drawings—

Figure 1 is a plan of the entire machine.

Figure 2, a perspective view of the rake and its operating parts.

Figure 3, a similar view of a detached part of the same.

Figure 4, a diagram illustrating the rising and falling of the rake.

A is the main frame, B B the driving-wheels, and C the platform, the latter being suitably jointed to the main frame, as shown at $a\ a$.

D D' are two pulleys, around which runs a chain, H, which gives motion to the rake E, by a pitman-rod, G. Pulley D is engaged with axle $b$ by means of a treadle, $c$, which presses said pulley against a coiled spring, $d$, and causes a slot of the pulley to strike over a pin of the axle.

Thus far the construction is the same as in my patent before alluded to.

On the inner side of the platform is mounted a concentric rod, I, on which slides the eye $f$ of an axial bolt, K.

On this bolt turn an arm, L, and a cam, M, the latter being preferably of upright form, and situated in an eye or socket of the former. The pitman-rod G forms a stiff connection with the cam, by passing through a slot, $g$, or otherwise, so that the movements of the cam are controlled by the pitman-rod. The opposite end of arm L is jointed to a swing-arm, N, which turns on axle $h$.

The rake-head is secured at the inner end to a rock-arm, P, pivoted at $i$ to arm L. This rock-arm has a vertical leg, $k$, with which connects a cord or chain, $l$, attached at such an intermediate position to the platform that, at the extent of each forward and backward movement of the rake in its sweep, it draws upon the leg $k$, and depresses and elevates the rake alternately to pass over the platform. This action is clearly shown in fig. 4.

The rock-arm, also, has a spring latch, Q, which, when the rake-head shuts down in front, springs under a catch, $m$, and serves to hold the rake-head down while the latter sweeps over the platform.

The action is as follows:

The revolutions of chain H carry the rake-head forward and back over the platform, in an alternately elevated and depressed position. When the rake reaches the front, the cord $l$ straightens and draws the head down, the latch Q at the same time engaging with catch $m$. When the rake reaches the rear of the platform, the action of pitman G throws cam M out sidewise against latch Q, thereby releasing it from catch $m$, and at the same time cord $l$ straightens in the opposite direction, which throws the rake up again.

This arrangement of parts is very simple and effective, and obviates any fastening of the outer end of the rake down to the railing of the platform, as it sweeps over. At the same time it produces an improved movement of the rake-head, said movement being to first start the heel of the rake inward at an angle to the outer end, in which position it sweeps for a short distance, then to give the outer end a more rapid motion than the inner, till the radial position is again restored, when the rake sweeps bodily over the rear of the platform, to discharge the grain. The initial movement of the heel of the rake, as above described, not only accomplishes the result of starting the butts of the straw in the earliest and most effective manner, but it also produces a drawing end motion of the outer end of the rake-head, which pulls the straw away from the outer rim of the platform, to lessen friction and avoid clogging. This result is produced by the joint action of the two arms, L N, and was not produced by my first patent before referred to.

What I claim as my invention, is—

1. The arrangement of the jointed arms L N, rock-arm P, cam M, latch Q, catch $m$, and cord or chain $l$, the whole operating in the manner and for the purpose specified.

2. The combination of the cam M, with pitman G, spring latch Q, and catch $m$, as described, and for the purpose specified.

3. The described arrangement of the single cord or chain $l$ with the rake E, to elevate and depress said rake at the extreme of each motion, substantially as set forth.

In witness whereof I have hereunto signed my name in the presence of two subscribing witnesses.

VANDERLYN HOWARD FELT.

Witnesses:
  GEO. V. WILSON,
  A. BOLE.